United States Patent
Yamaguchi

(10) Patent No.: US 7,974,087 B2
(45) Date of Patent: Jul. 5, 2011

(54) CARTRIDGE TYPE HARD DISK DRIVE AND IMAGE FORMING APPARATUS

(75) Inventor: Yoshimasu Yamaguchi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 356 days.

(21) Appl. No.: 12/127,568

(22) Filed: May 27, 2008

(65) Prior Publication Data

US 2008/0225317 A1    Sep. 18, 2008

Related U.S. Application Data

(62) Division of application No. 11/318,877, filed on Dec. 28, 2005, now abandoned.

(30) Foreign Application Priority Data

Dec. 28, 2004   (JP) ................................. 2004-378575

(51) Int. Cl.
*G06F 1/16* (2006.01)

(52) U.S. Cl. .................... 361/679.37; 725/39; 709/245; 345/473; 455/551; 360/77.12

(58) Field of Classification Search ................ 725/32, 725/39; 709/213, 228, 226, 245; 345/158, 345/619, 589, 1.1, 178, 175, 473, 156; 455/440, 455/446, 442.1, 551, 411, 405; 369/47.55, 369/30.01, 30.27; 360/97.01, 69, 39, 77.12; 358/1.14, 1.15; 361/679.32, 679.4, 679.55, 361/679.58, 679.01, 679.31, 679.02, 679.37, 361/679.08

See application file for complete search history.

(56) References Cited

U.S. PATENT DOCUMENTS

| | | | | |
|---|---|---|---|---|
| 4,941,841 | A | 7/1990 | Darden et al. | 361/685 |
| 5,793,714 | A * | 8/1998 | Inoue et al. | 369/30.34 |
| 6,293,636 | B1 | 9/2001 | Le et al. | 312/223.2 |
| 7,370,931 | B2 * | 5/2008 | Nunokawa | 347/19 |
| 7,609,417 | B2 * | 10/2009 | Hashimoto | 358/400 |
| 2004/0176170 | A1 * | 9/2004 | Eck et al. | 463/43 |
| 2004/0208492 | A1 * | 10/2004 | Oguro | 386/117 |
| 2005/0265169 | A1 * | 12/2005 | Yoshimaru et al. | 369/47.12 |

FOREIGN PATENT DOCUMENTS

| | | |
|---|---|---|
| JP | 2002-281197 A | 9/2002 |
| JP | 2002-311760 | 10/2002 |
| JP | 2004-255851 A | 9/2004 |

* cited by examiner

*Primary Examiner* — Hung V Duong
(74) *Attorney, Agent, or Firm* — Fitzpatrick, Cella, Harper & Scinto

(57) ABSTRACT

A cartridge type HDD unit 20 is mounted on the outside of a back plate panel 2 of an exterior cover rear portion in an image forming apparatus 1. An HDD main body is detachably attachable into a unit case 21. When the HDD main body is attached into the unit case 21, the HDD main body is substantially horizontally inserted from a sideways case opening 22. In the conventional art, there is the problem that the HDD main body is caused to fall carelessly in attachment working in which the HDD main body is mounted to a housing case such that the HDD main body drops into a housing case in a vertical direction. However the problem above described is eliminated, and the attachment working of the HDD main body can be performed easily and safely. With reference to security protection of information stored in the on-board mounted built-in HDD, the information stored in the built-in HDD can be transferred to and stored in the cartridge type HDD.

10 Claims, 14 Drawing Sheets

FIG.5
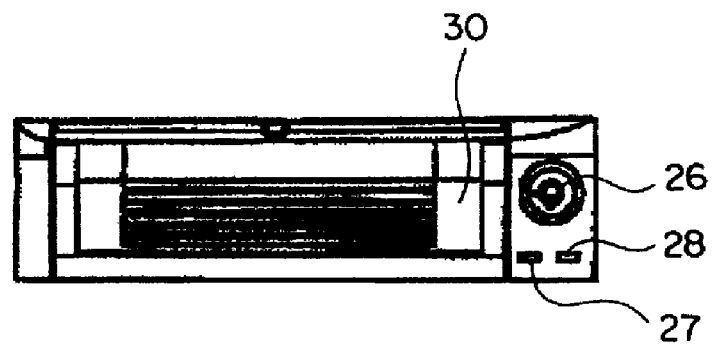
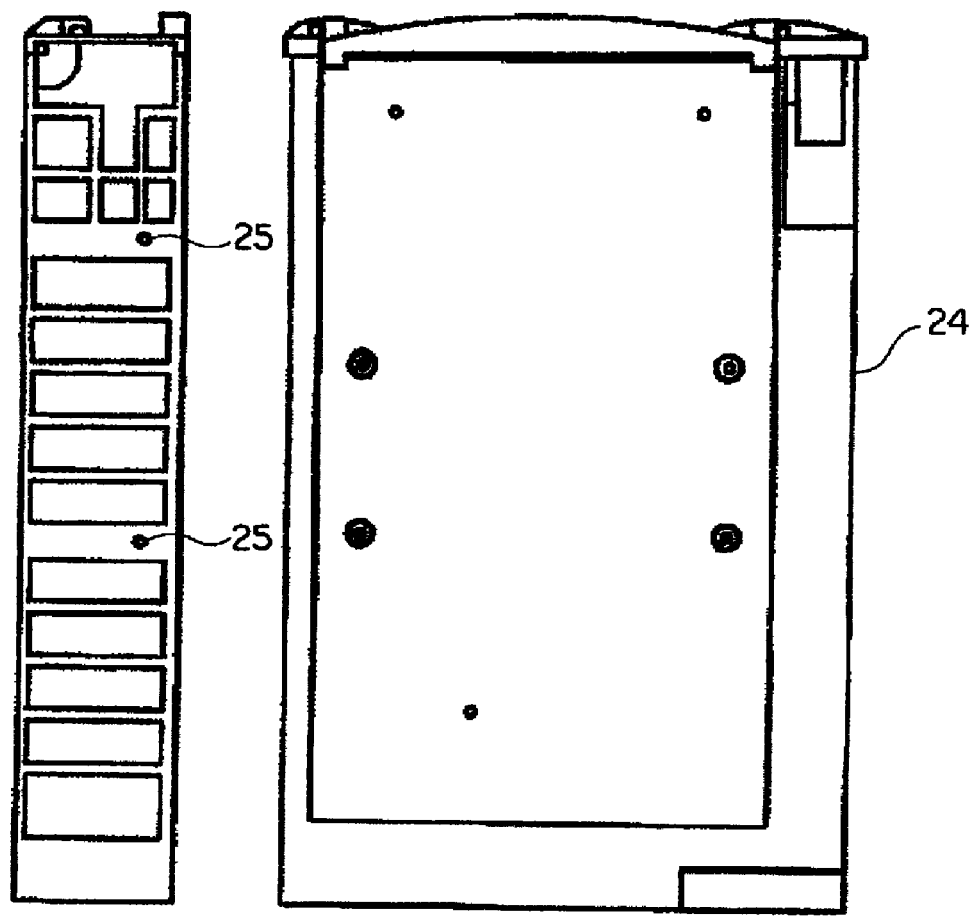

FIG.6
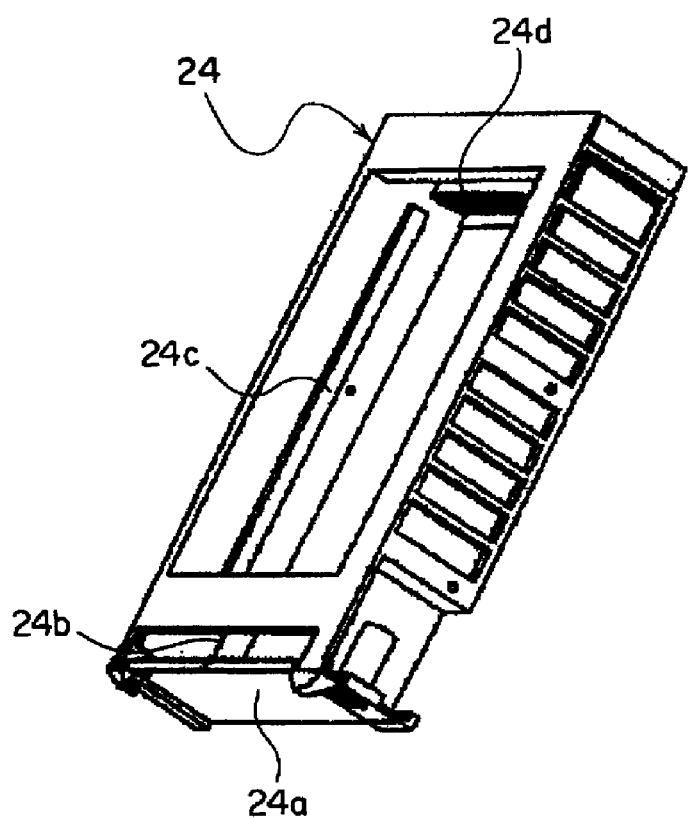
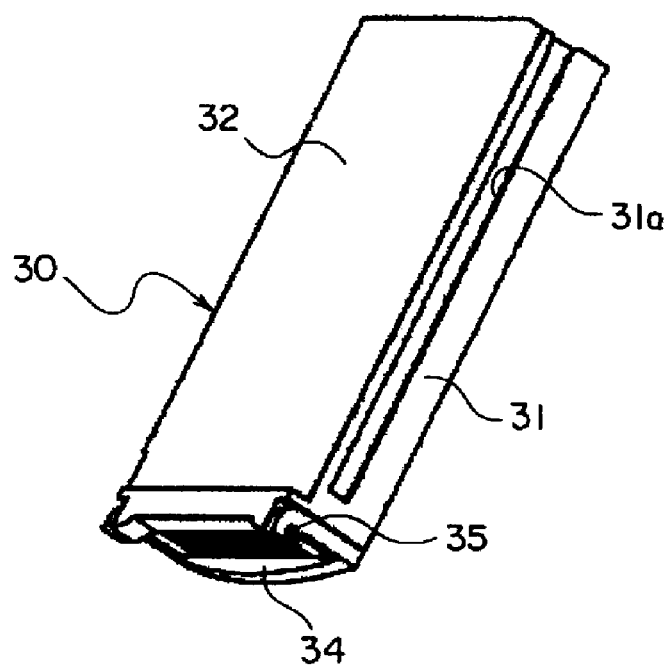

CARTRIDGE TYPE HARD DISK DRIVE AND IMAGE FORMING APPARATUS

RELATED APPLICATIONS

This application is a division of co-pending application Ser. No. 11/318,877, filed Dec. 28, 2005, which is incorporated by reference herein in its entirety, as if fully set forth herein, and claims the benefit of priority under 35 U.S.C. §119, based on Japanese Priority Application No. JP 2004-378575, filed Dec. 28, 2004, which is incorporated by reference herein in its entirety, as if fully set forth herein.

BACKGROUND OF THE INVENTION

1. Field of the Invention

The present invention relates to a cartridge type hard disk drive (hereinafter referred to as cartridge type HDD) which substitutes for a function of a built-in HDD for the purpose of security protection of information stored in the built-in HDD and an image forming apparatus in which the cartridge type HDD is mounted.

2. Description of the Related Art

Recently the image forming apparatus is made multifunctional, and the image forming apparatus has the functions of a facsimile, a printer, and a copying machine. Further, the same kinds or the different kinds of pieces of image forming apparatus are connected through a network such as LAN to print image information inputted and outputted, and the image forming apparatus is used as a reading terminal of the image information. The multifunctionalization of the image forming apparatus is dealt with by upgrading storage means such as RAM until now. However, because the storage capacity which can deal with the multifunctionalization has a limitation, an on-board mounted large-capacity built-in HDD is used as a storage medium. Access information by write signal and a read signal, main firmware information for controlling the apparatus, machine state information, and maintenance status information are stored in the built-in HDD.

From a viewpoint of information protection that leakage and theft of the important security information stored in the built-in HDD are prevented, in some countries such as the United State, a model of the image forming apparatus is regulated. That is, that the apparatus has a function of detaching the built-in HDD, in which the security information is stored, from the apparatus main body to be able to store the built-in HDD during non-working hours is defined as the condition in introducing the apparatus.

According to the situation described above, the image forming apparatus is put into practical use, in which the information stored in the built-in HDD on-board mounted on the image forming apparatus main body is moved and stored in the cartridge type HDD and then the cartridge type HDD is detached and stored to prohibit operation of the built-in HDD during detaching the cartridge type HDD from the image forming apparatus. Usually the cartridge type HDD is unitized by housing the cartridge type HDD in a case, and the cartridge type HDD unit is mounted on the outside of the image forming apparatus while being detachably attachable to the image forming apparatus (for example, see Japanese Patent Application Laid-Open No. 2002-311760).

In some of the cartridge type HDD units, a PC slot is provided such that the 3.5-inch type cartridge type HDD can normally be attached to HDD having the 5-inch type storage medium. In some of the cartridge type HDD units, an attachment is provided inside a unit case such that the 2.5-inch type cartridge type HDD can be attached. In these cartridge type HDD units, a rotary shatter cover is provided in a front portion of the unit case, and the cartridge type HDD is detachably attachable by pressing and opening the shutter cover. Connectors for IDE cable connection and power connection are provided in a deep portion inside the unit case to bring the cartridge type HDD into an electrical conduction state.

Usually the cartridge type HDD unit is attached to the image forming apparatus in the following way. An opening of the unit case is fixedly provided in a back plate panel of an exterior cover rear portion of the image forming apparatus while orientated upward in a vertical direction. In attaching and detaching the HDD main body, a user grasps the HDD main body to insert the HDD main body into the unit case from the opening such that the HDD main body falls into the unit case. A considerably large window is provided in the back plate panel of the exterior cover in which the unit case is provided, and a power cable of the cartridge type HDD unit and the like are drawn into the image forming apparatus from the window and connected to an electric component unit of the main body.

When the cartridge type HDD main body is attached into and detached from the unit case mounted on the exterior cover of the image forming apparatus, sometimes the user or a maintenance person carelessly causes the following troubles.

One of the troubles is derived from a problem with a position of the unit case mounted on the side plate panel in the exterior cover rear portion of the image forming apparatus. In attaching and detaching the cartridge type HDD main body, the operator face a front face of the image forming apparatus while grasping the cartridge type HDD main body. Then, the operator extends operator's arm to the back plate panel in the exterior cover rear portion which is not clearly viewed by an uncomfortable attitude, and the operator tries to insert the cartridge type HDD main body into the unit case from the upper side. In this case, there is a possibility that the operator causes the cartridge type HDD main body to fall due to the operation by the uncomfortable attitude to lead to cartridge type HDD main body breakage and storage data loss.

Another trouble is a possibility that the storage data is broken when the image forming apparatus main body improperly receives a signal in attaching and detaching the cartridge type HDD main body. The above problems are attributed to the fact that a fail-safe countermeasure for prohibiting the careless attachment and detachment of the cartridge type HDD main body is not taken in receiving the various signals in the image forming apparatus.

SUMMARY OF THE INVENTION

In view of the foregoing, an object of the invention is to provide a cartridge type HDD which the information stored in the built-in HDD can be moved to and stored in with reference to the security protection of the information stored in the on-board mounted built-in HDD, and an image forming apparatus on which the cartridge type HDD is mounted so as to be detachably attachable.

Another object of the invention is to provide an image forming apparatus including a hard disk drive housing case which is mounted to the image forming apparatus main body; a hard disk drive which is built in the image forming apparatus main body; and a cartridge type hard disk drive main body in which information can be stored, the cartridge type hard disk drive main body being detachably attachable to the hard disk drive housing case; wherein the cartridge type hard disk drive main body is attached to the hard disk drive housing case, and thereby the cartridge type hard disk drive main body is connected while being able to perform transmission and reception with the hard disk drive.

Further objects of the invention will be apparent from the following description.

BRIEF DESCRIPTION OF THE DRAWINGS

FIG. 5A is a plan view showing the cartridge type HDD unit.

FIG. 5B is a side view showing the cartridge type HDD unit.

FIG. 5C is a front view showing the cartridge type HDD unit.

FIG. 6 is an exploded perspective view showing a state in which the cartridge type HDD is inserted into a unit case.

DESCRIPTION OF THE PREFERRED EMBODIMENT

Then, a cartridge type HDD and an image forming apparatus according to preferred embodiments of the invention will be described in detail with reference to the accompanying drawings.

Figure 1:
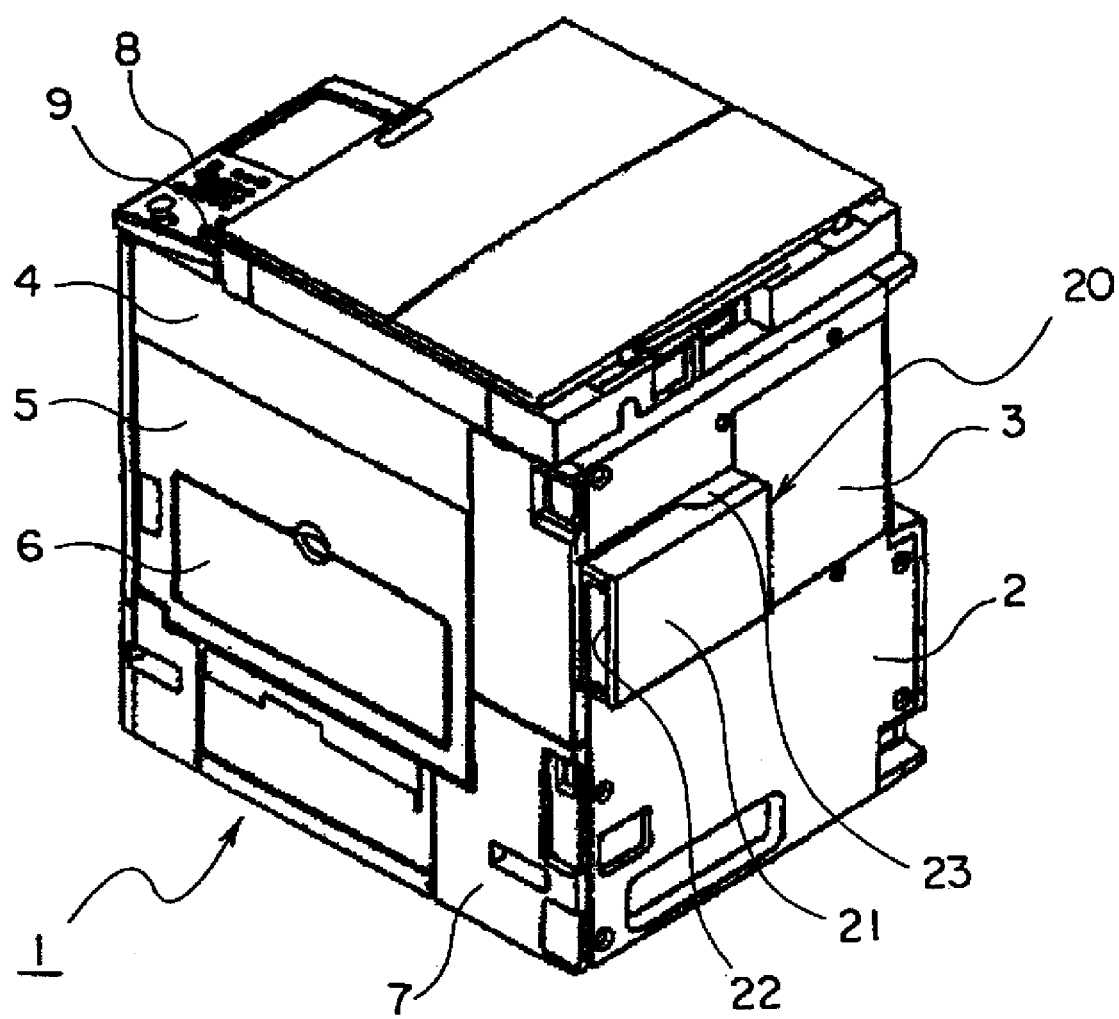
FIG. 1 is a rear-side perspective view showing an image forming apparatus according to an embodiment of the invention equipped with a cartridge type HDD unit according to an embodiment.
Figure 2:
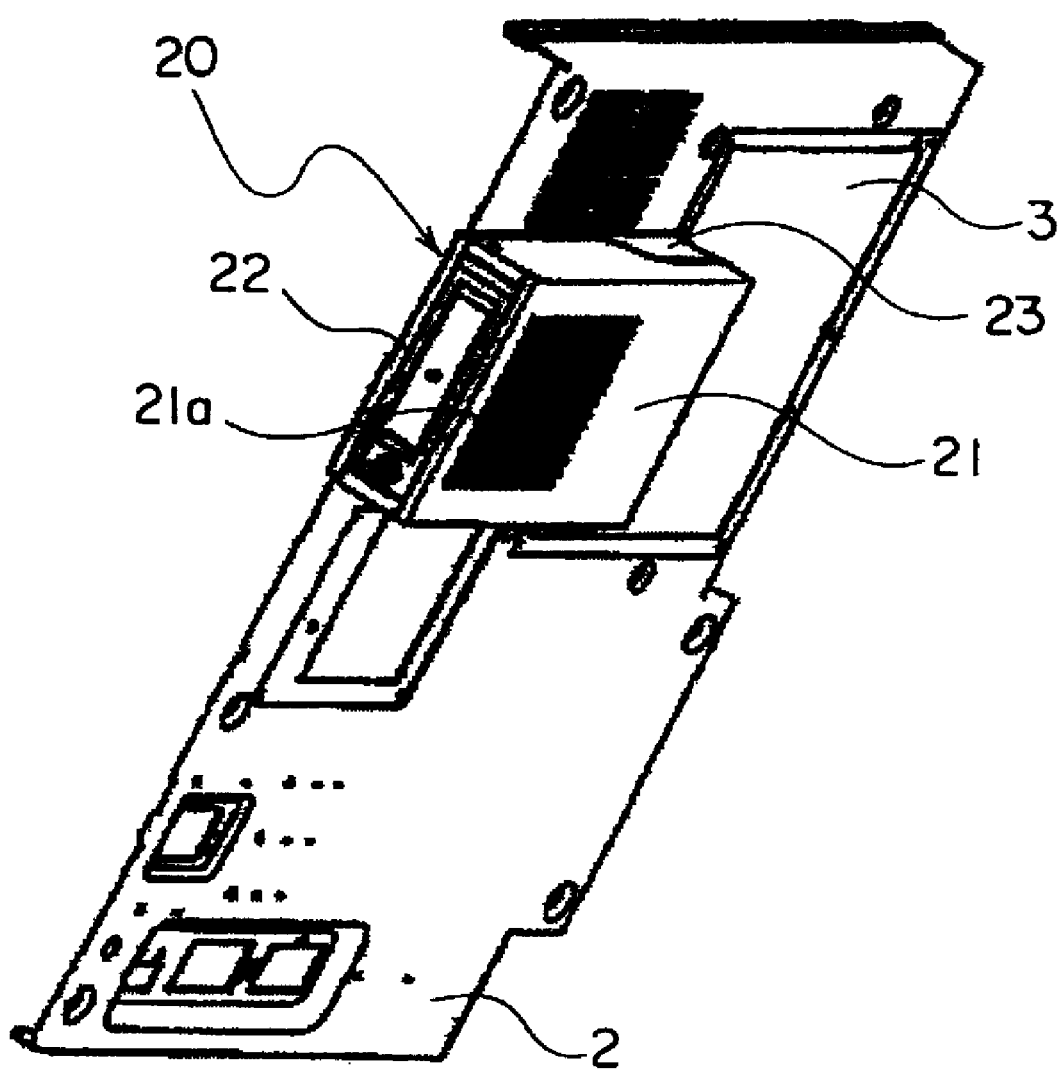
FIG. 2 is a perspective view showing a back plate of an exterior cover rear portion to which the external cartridge type HDD unit is mounted.

As shown in FIGS. 1 and 2, a cartridge type HDD unit 20 which is of a main part of an embodiment is fixed to a back plate panel 2 of an exterior cover rear portion in an image forming apparatus 1 by caulking using screws or rivets. The cartridge type HDD unit 20 is attached to the image forming apparatus 1 such that a case opening 22 located in a front face of the cartridge type HDD unit 20 is substantially aligned with a panel surface of a side plate panel 4 of an exterior cover side portion. At a position adjacent to the cartridge type HDD unit 20, a controller cover 3 is detachably provided in a part of the back plate panel 2. In this case, when the apparatus main body is viewed from a front surface, the side plate panel 4 is a right-side exterior cover to which an operator can easily get access, and the side plate panel 4 is, for example, the fixed cover which is not detached. A right door 5 is provided in the right-side side plate panel 4. The right door 5 is a jam check door which is opened and closed when a jam clearance operation or the like is performed. Usually a space necessary to open and close the right door 5 is secured in a location facing to the right-side side plate panel 4, and other instruments and tools are not placed on the space.

The space secured on the right side of the image forming apparatus 1 in which the case opening 22 is substantially aligned with the panel surface of the side plate panel 4 is room for extending a tray which is of multi-sheet feeding means 6, and the space is also room for opening and closing a door which is of an opening and closing portion of a sheet conveyance path of a sheet feeding unit 7. Therefore, in the right side of the apparatus front face, the apparatus rear portion can clearly be viewed because of the space, and the case opening 22 of front face of the unit case 21 which is of a HDD housing case in the cartridge type HDD unit 20 can also clearly be viewed with no obstacle in working.

The case opening 22 is a cartridge attaching and detaching port, and a cartridge type HDD 30(see FIG. 6) can comfortably be attached into and detached from the case opening 22 in the substantially horizontal direction.

Unlike the conventional case opening which is opened upward, the case opening 22 is opened toward the substantially horizontal direction, so that foreign materials can be prevented from falling into and invading the case opening 22 from the HDD main body attaching and detaching port.

Further, since the cartridge can horizontally be attached and detached, shock is hardly received in attaching and detaching the cartridge. Therefore, the cartridge type HDD unit 20 can be safely handled and the failure is hardly occurs in use.

An operation panel 8 is provided in a front portion of the main body of the image forming apparatus 1. The operation panel 8 can perform settings such as sheet selection, facsimile, e-mail, printer, and copy operations. An LCD screen, operation buttons, and the like are provided in the operation panel 8. The LCD screen is a display unit which displays status of the apparatus and also displays that the attachment or detachment of the HDD main body is permitted. A HDD turn-off switch 9 is provided near the operation panel 8 for stopping the operation of the built-in HDD which is on-board mounted in the image forming apparatus 1. When the operator attaches and detaches the cartridge type HDD 30 into and from the cartridge type HDD unit 20, in order to prevent the data breakage in the built-in HDD and the cartridge type HDD 30 because the cartridge type HDD 30 is attached and detached although the built-in HDD is operated, the built-in HDD and the cartridge type HDD 30 are protected by previously stopping the operation of the built-in HDD. The HDD turn-off switch 9 is an attaching and detaching instruction switch which permits the attachment and detachment of the cartridge type HDD main body.

Thus, since the HDD turn-off switch 9 and the display unit are arranged near the operation panel 8, the attaching and detaching operation of the HDD main body is performed while the HDD turn-off switch 9 and the display are confirmed, which allows working mistake to be avoided. The same effect can be obtained when the display unit and the HDD turn-off switch 9 are arranged near the cartridge type HDD attaching and detaching portion.

Figure 3:
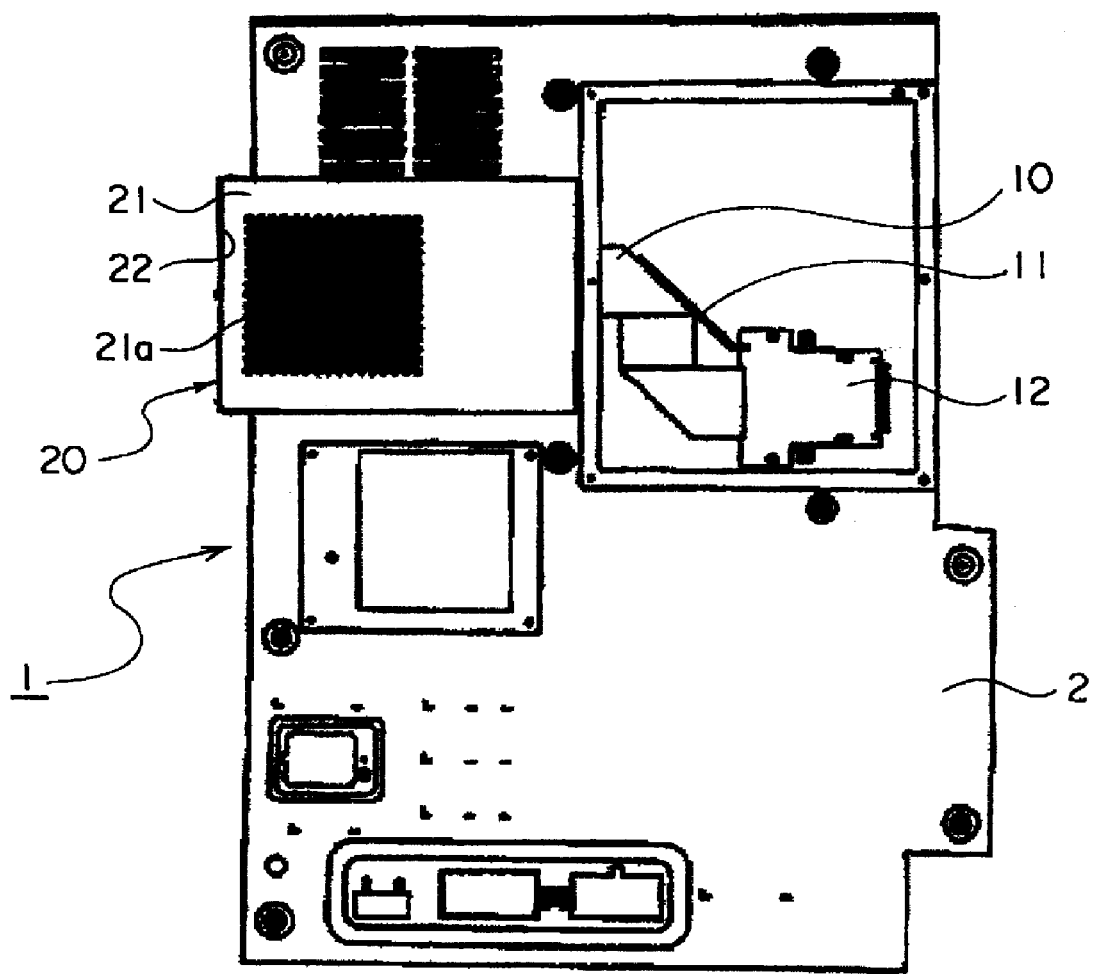
FIG. 3 shows a state in which a controller cover is detached when the back plate is viewed from a front face.

FIG. 3 shows a state in which the controller cover 3 is detached. In FIG. 3, an interface connection connector unit of the cartridge type HDD unit 20 and an IDE conversion printed board 12 are connected to each other with an IDE cable 10 and a power cable 11, which are extended from a control unit of the image forming apparatus 1, through connectors.

Figure 4:
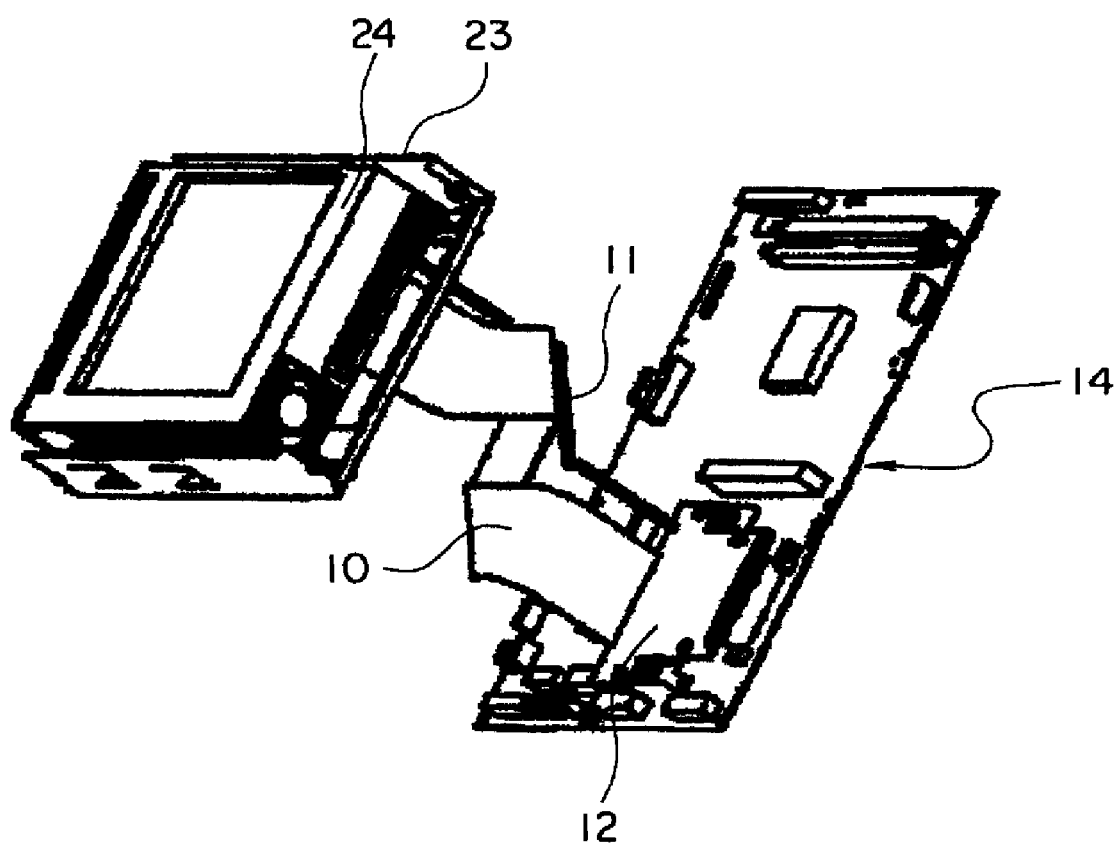
FIG. 4 is a perspective view showing a connection mode between the cartridge type HDD unit and a control board.

Each component of the cartridge type HDD unit 20 will be described below. The cartridge type HDD unit 20 further has an interior case 23 inside the unit case 21. As shown in FIG. 4, a cartridge housing 24 is housed in the interior case 23. The cartridge housing 24 is fixed to the interior case 23 from upper and lower surfaces by the screws. The cartridge housing 24 is connected to the IDE cable 10 and the power cable 11, and connected to the IDE conversion printed board 12, mounted on a control board 14 of the image forming apparatus 1, by the connector. Louver holes 21a (see FIG. 2) are made to dissipate heat inside the unit case 21.

The unit case 21 is mounted on the outside of the back plate panel 2 of the exterior cover rear portion in the apparatus main body while protruded from the apparatus main body. Therefore, it is not necessary that the HDD is individually prepared according to a dimension and a shape of HDD holding space of the model of the image forming apparatus, and only one kind of the cartridge type HDD unit can be provided as standard.

FIGS. 5A to 5C show the cartridge housing 24 and the cartridge type HDD 30 which is attached therein. The cartridge housing 24 is fixed to the interior case 23 by attachment screws 25. The cartridge type HDD 30 is attached into the cartridge housing 24, and the cartridge type HDD 30 is locked by a lock key 26 such that the cartridge type HDD 30 cannot carelessly be detached. That is, while the lock key 26 mechanically locks the cartridge type HDD 30, the lock key 26 has an electrical ON-switch function. When the lock key 26 mechanically locks the cartridge type HDD 30 to cause the cartridge type HDD 30 to be in an ON state, at the same time the electric power is turned on. A front face of the cartridge is an operation face in which an HDD power indicator LED (light emitting diode) 27 and an HDD access indicator LED 28 are provided and the operator can recognize the electric power and the HDD access state.

As shown in FIG. 6, when the cartridge type HDD 30 is inserted and attached into the cartridge housing 24, the cartridge type HDD 30 presses a housing door 24a which is usually closed by a torsion coil spring 24b provided in the front portion of the cartridge housing 24, and the housing door 24a can be opened inward to insert the cartridge type HDD 30 into the cartridge housing 24. When the cartridge type HDD 30 is located outside the cartridge housing 24 as shown in FIG. 6, in the housing door 24a, the housing opening is closed by biasing force of the torsion coil spring 24b.

Protruded guide rails 24c extending lengthwise are formed in both side plate portions in the cartridge housing 24 respectively such that the attaching and detaching operation of the cartridge type HDD 30 is performed properly and smoothly. The guide rails 24c are fitted in recessed guide grooves 31a provided lengthwise on the both sides of an chassis 31 of the cartridge type HDD 30 respectively, which allows the guide grooves 31a to guide the guide rails 24c while the guide rails 24c slides in the guide grooves 31a in inserting the cartridge type HDD 30. A connector 24d is provided in a deep portion of the cartridge housing 24. When the cartridge type HDD 30 is inserted, an HDD-side connector 39 shown in FIG. 7 abuts on the connector 24d to establish the electrical connection.

Figure 7:
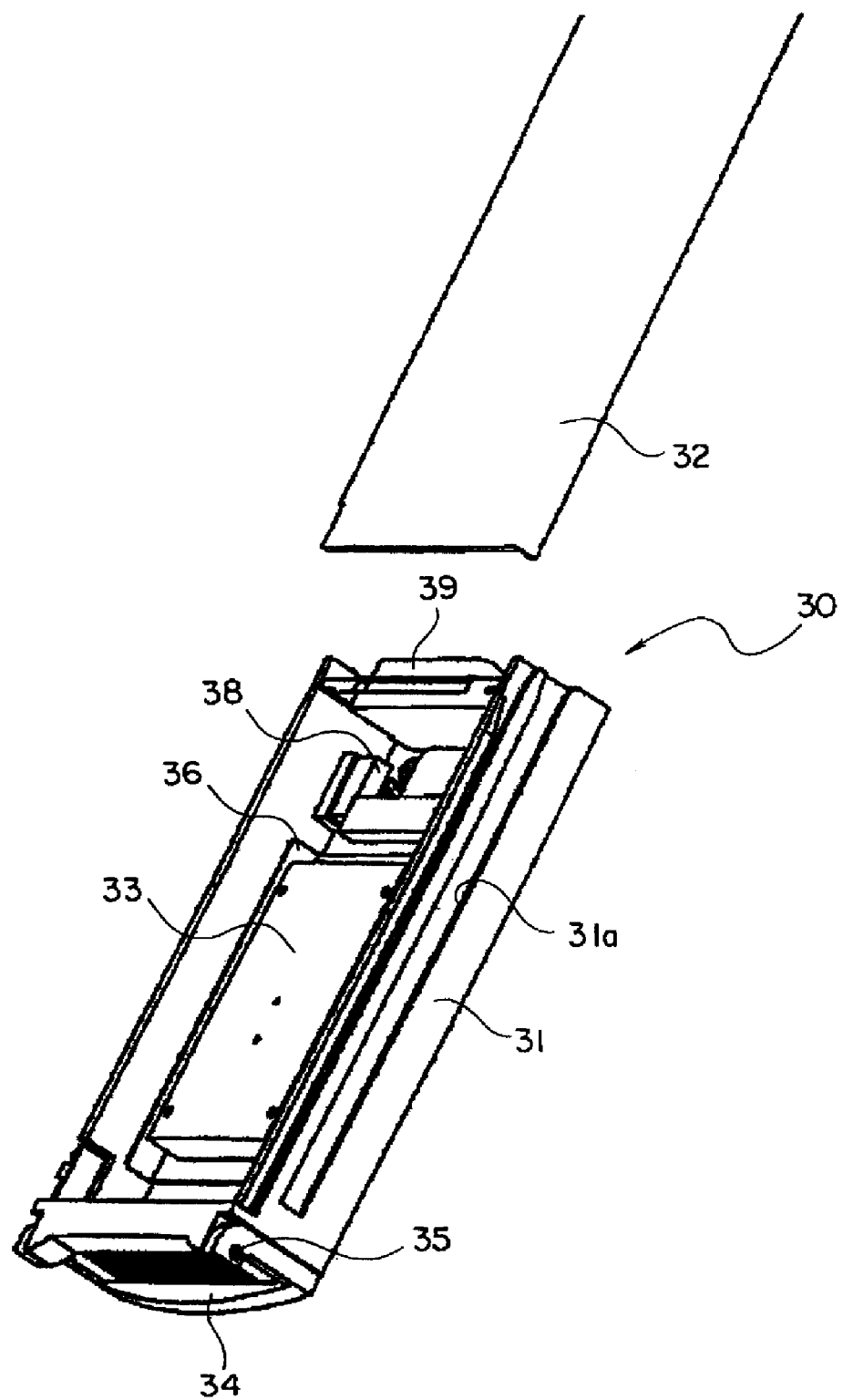
FIG. 7 is an exploded perspective view showing a state in which a cap is opened in the cartridge type HDD.
Figure 8:
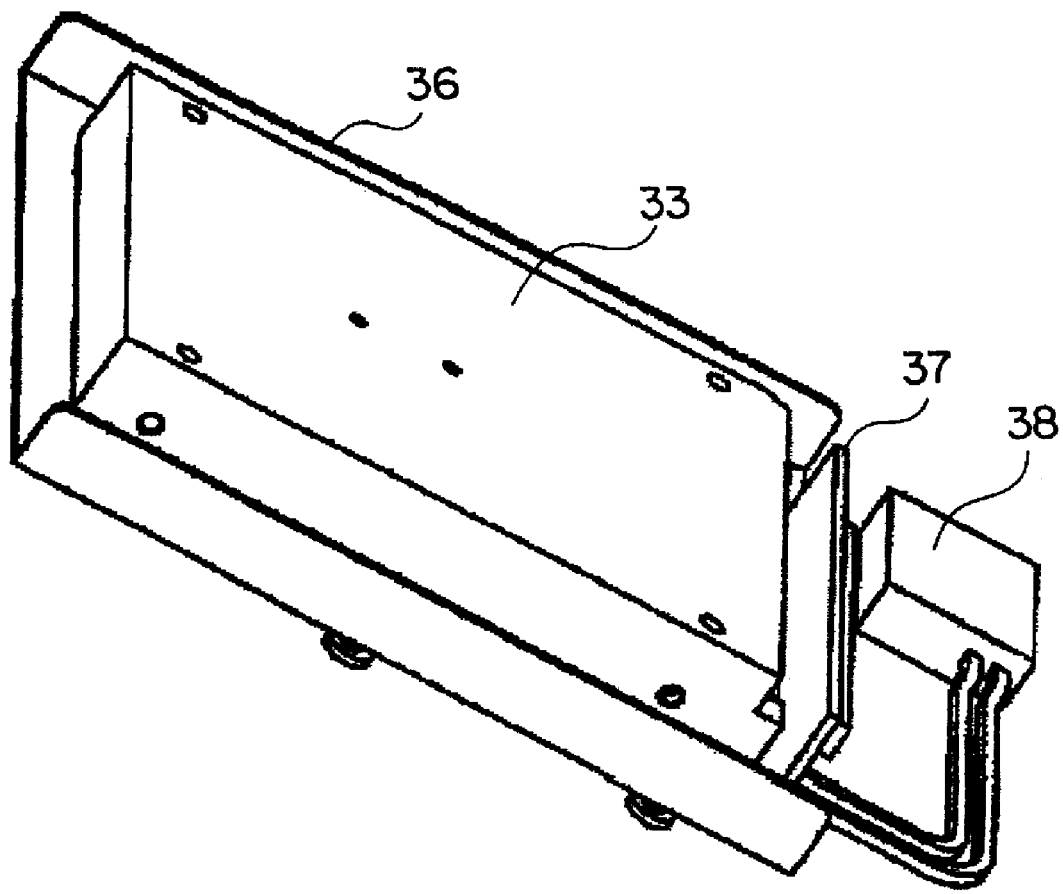
FIG. 8 is a perspective view showing a cartridge type HDD according to an embodiment.

FIG. 7 shows an inner structure of the cartridge type HDD 30. The cartridge type HDD 30 has a cap 32 which opens and closes a cartridge chassis 31. A handle 34 is rotatably provided in the front portion of the chassis 31 through a handle support shaft 35. When the HDD main body 33 is drawn from the chassis 31, the HDD main body 33 is drawn by grasping the handle 34. In the chassis 31, for example, a 2.5-inch HDD kit is mounted by the screws as shown in FIG. 8. An aluminum material is usually used as a sheet metal of the 2.5-inch HDD kit, and the 2.5-inch type HDD main body 33 is screwed to the sheet metal to dissipate the heat. The HDD main body 33 is fixed to the lower portion of chassis 31 by the screws. The HDD main body 33, the HDD main body 33 is protected by fixing through a spacer such as a rubber damper to absorb vibration from an environment as needed. The HDD main body 33 is connected to a printed board 37 through a connector in a side face, and the HDD main body 33 is connected to the power cable through a signal cable connection connector 38.

Figure 9:
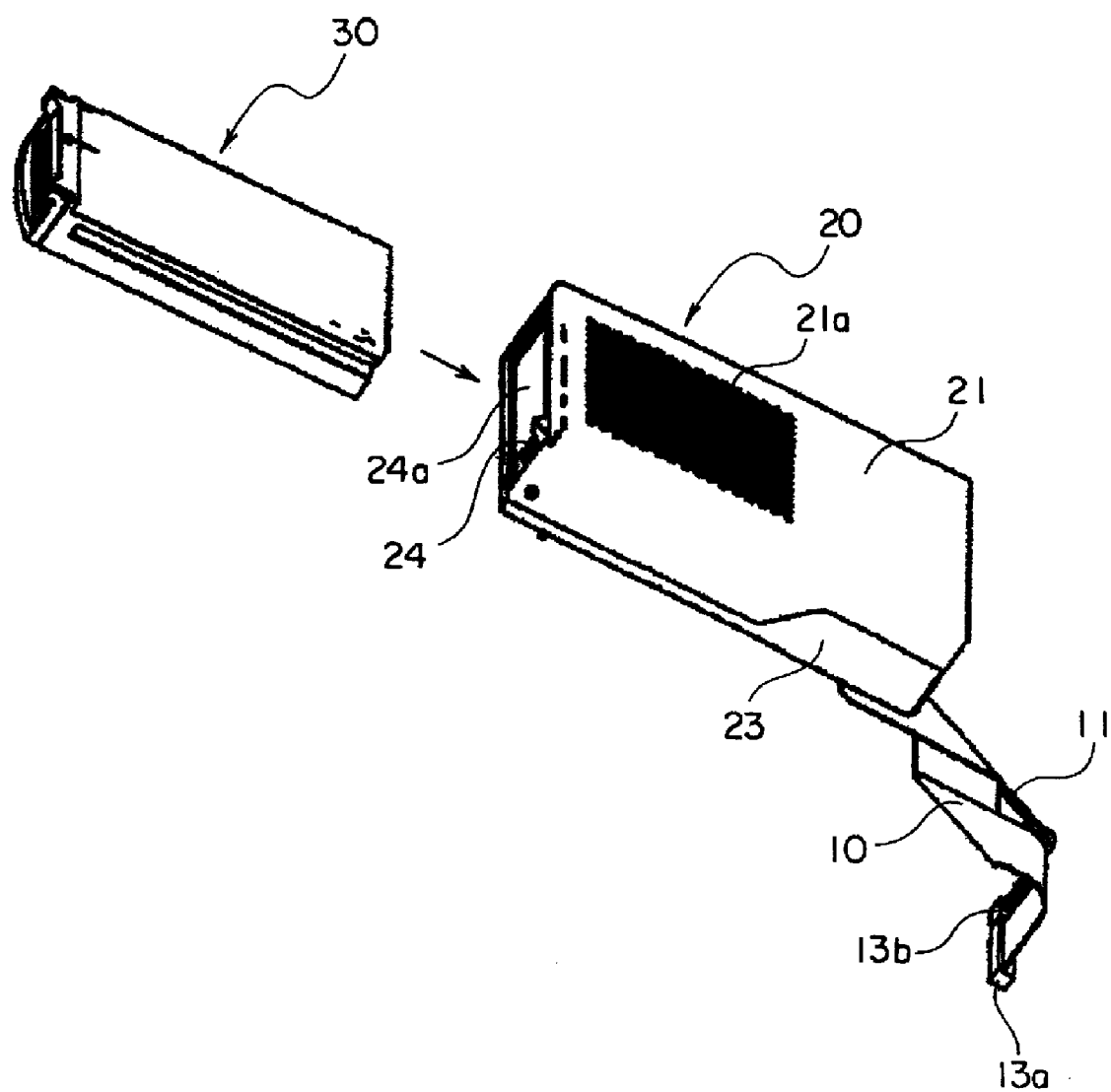
FIG. 9 is a perspective view showing a state in which the cartridge type HDD is inserted into the unit case.

As shown in FIG. 9, when the cartridge type HDD 30 is attached into the unit case 21 of the cartridge type HDD unit 20, the cartridge type HDD 30 is pressed into while the housing door 24a in the front portion of the cartridge housing 24 is rotated inward, which allows the cartridge type HDD 30 to be electrically connected to the connector in the deep portion. Then, the cartridge type HDD 30 is fixed and locked by the lock key 26 (see FIG. 5) in the front portion of the housing. The IDE cable 10 and power cable 11 drawn from the cartridge type HDD unit 20 are connected to the control board 14 (see FIG. 4) through an IDE connection connector 13a and a power connector 13b respectively.

Figure 10:
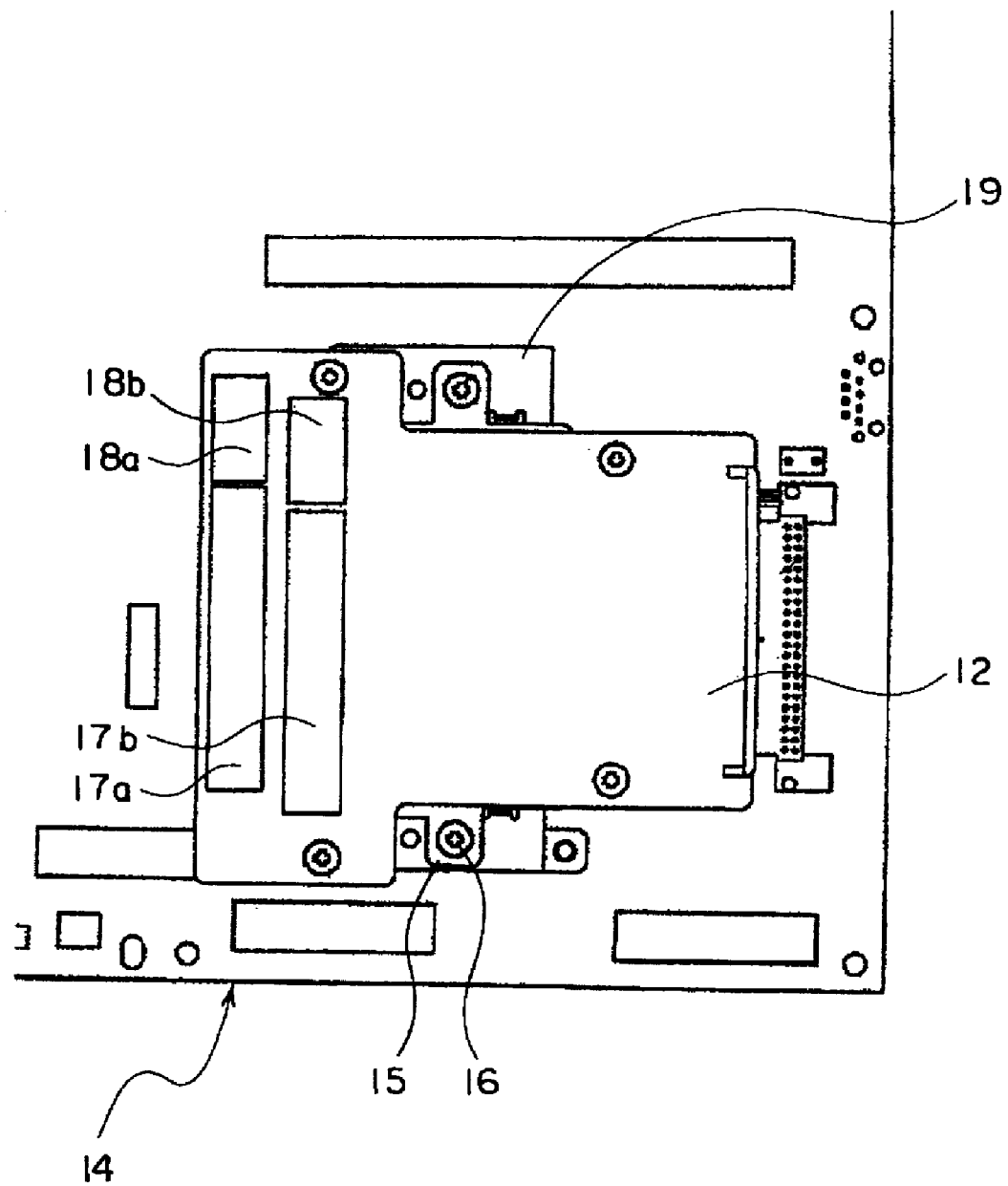
FIG. 10 is a plan view showing a layout of the control.

FIG. 10 shows an example of a layout in which the IDE conversion printed board 12 is mounted on the control board 14 of FIG. 4. The IDE conversion printed board 12 is fixed to an IDE conversion printed board holding bracket 15 by screws 16. For example, an HDD connection connector 17 compatible with a 2.5-inch type storage medium is arranged in right angle type by soldering. An IDE connector (primary) 17a and an IDE connector (secondary) 17b, power connectors 18a and 18b, and the like are provided on one side of the IDE conversion printed board 12, and the plural cartridge type HDDs 30 can be added on by the IDE cable or the power cable. In the case of the layout shown in FIG. 10, the on-board mounted built-in HDD is taken out once, the IDE conversion printed board holding bracket 15 is fixed to an HDD mounting stage 19 by the screws 16, and the IDE conversion printed board 12 is fixed to the IDE conversion printed board holding bracket 15 by the screw.

Thus, the cartridge type HDD and the image forming apparatus according to the embodiments of the invention are described. The invention is not limited to the above embodiments, but various modifications could be made without departing from the scope of the invention.

Figure 11:
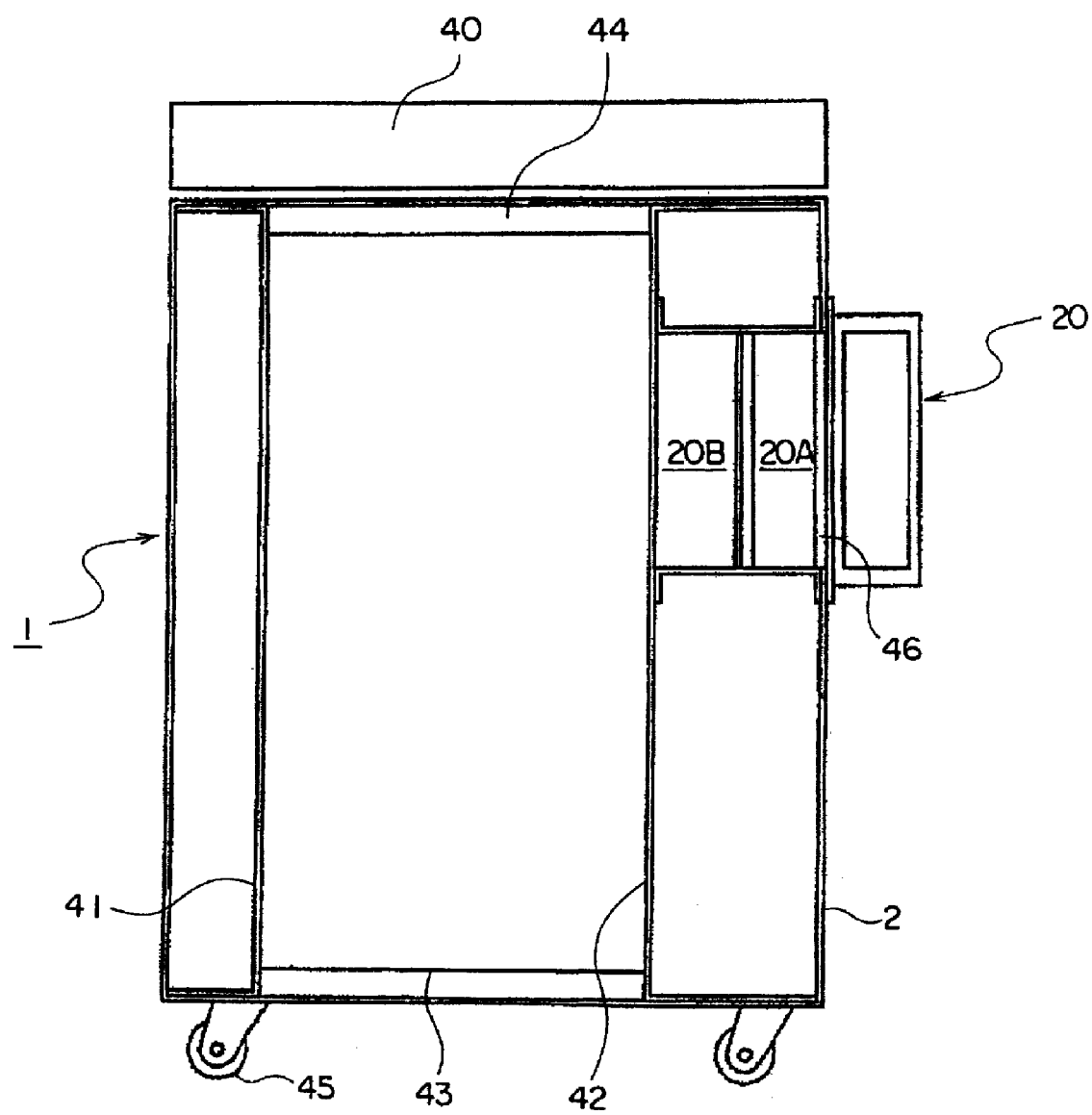
FIG. 11 shows a main body of an image forming apparatus according to a second embodiment on which plural cartridge type HDD units are mounted.

For example, as shown in FIG. 11, it is also possible that the plural cartridge type HDD units including pairs of the cartridge type HDD housing case and HDD main body are provided.

That is, in addition to the cartridge type HDD unit 20 which is mounted on the outside of the main body rear portion while protruded from the image forming apparatus 1, plural cartridge type HDD units 20A and 20B can be provided in the main body. In this case, the cartridge type HDD units 20A and 20B are provided inside the exterior cover. In this case, a scanning read unit 40 is mounted in the upper portion of the image forming apparatus 1, and the image forming apparatus includes a side plate 41 in the front portion of the main body, a side plate 42 in the rear portion of the main body, a lower stay 43 in the lower portion of the main body, an upper stay 44 in the upper portion of the main body, and casters 45 provided on a bottom plate of the main body.

Therefore, data storage capacity can be increased and data backup can always be performed. The data can be protected securely and safely without losing data and information such as control firmware and log data in the breakdown of HDD.

In the above embodiment, the cartridge type HDD unit 20 is fixed to the back plate panel 2 in the exterior cover rear portion of the image forming apparatus 1 by the screw or calking with the rivet. Alternatively, it is also possible that the unit case 21 is detachably attachable to a latch hole, made in the back plate panel 2, so as to be caught in the latch hole. In this case, raised and bent formed portions extending in key shapes may be provided in an attachment surface of the unit case 21, and the cartridge type HDD unit 20 is caught by the raised and bent formed portions to prevent the cartridge type HDD unit 20 from falling, even if the operator releases operator's hand from the cartridge type HDD unit 20, before the cartridge type HDD unit 20 is fixed to the back plate panel 2 by the screws.

Usually various vibrations are applied to the image forming apparatus 1 placed in an office environment and the like. For example, the opening and closing of ADF, the opening and closing of the sheet cassette, the vibration of a flapper in the sheet conveyance path, the opening and closing of the door of the sheet conveyance path, attachment and detachment of optional large-capacity deck, the vibration of a finisher, and the like easily have an adverse affect on HDD which is sensitive to the vibration. An access frequency is high in order to write and read the data in and from HDD, and the failure frequency (disk crash) of HDD built in a personal computer is high, so that it is necessary that HDD is changed in each failure. Therefore, in order to deal with the use in such environments in which the data cannot sufficiently be protected from breaking, and in order to satisfy the major point of the invention, one of the plural HDDs is used as a sub-HDD which is concurrently process for data backup. Accordingly, even if one of the cartridge type HDD units 20 crashes, time loss can be eliminated, if the control is performed such that another cartridge type HDD unit is immediately operated.

Further, even if one of cartridge type HDD units is broken, resumption can easily be performed only by turning off the power to change the broken cartridge type HDD unit to the new cartridge type HDD unit. In the writing operation into the new cartridge type HDD unit, the backup is made by performing automatic recognition while a print job does not exist. Therefore, high reliability and safety are obtained.

As shown in the embodiment of FIG. 11, the cartridge type HDD unit 20 mounted on the outside of the main body rear portion while protruded from the main body is fixed to a cap-shaped support plate 46. The support plate 46 is prepared while separated from the back plate 2 (see FIG. 1) of the exterior cover, so that the cartridge type HDD unit 20 can be detached without detaching the back plate 2. Therefore, when the operator performs maintenance and check in the apparatus, the cartridge type HDD unit 20 and the support plate 46 are previously taken out, which further facilitates the handling of the cartridge type HDD unit 20.

Figure 12:
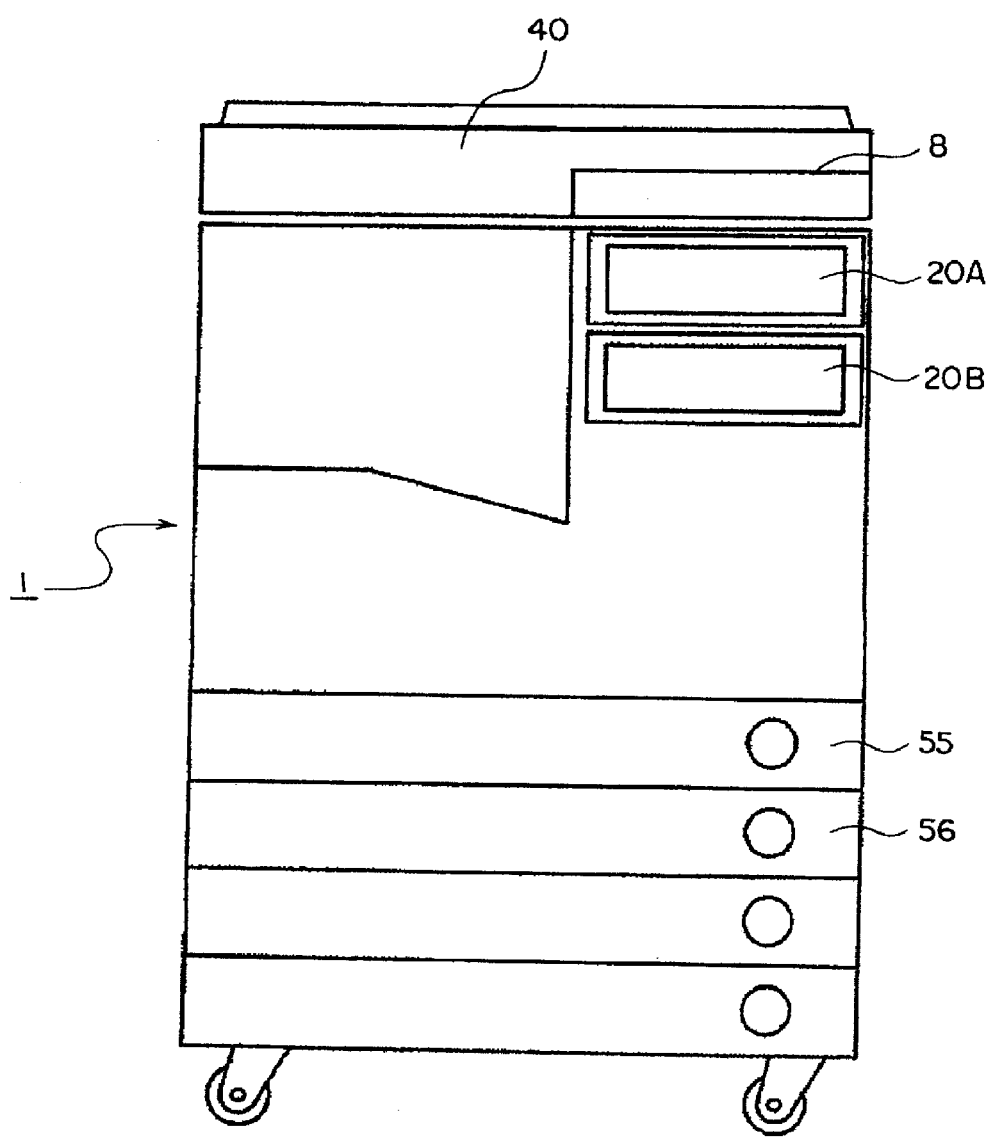
FIG. 12 shows a main body of an image forming apparatus according to a third embodiment in which the plural cartridge type HDD units are embedded.

FIG. 12 shows an embodiment, in which the plural HDD units 20A and 20B of the cartridge type HDD unit 20 are arranged near the operation panel 8 when the cartridge type HDD unit 20 is relatively frequently attached and detached, unlike the layout described in the embodiment of FIG. 11 in which the space of the side face on the right side in the main body rear portion of the image forming apparatus 1 is utilized. According to the embodiment shown in FIG. 12, particularly in the case where national security is dealt with, the cartridge type HDD units are detached on a daily basis when the work is finished, and the cartridge type HDD units are stored in a storage cabinet, so that the arrangement of the cartridge type HDD units in the front face is preferable from visual and working perspectives when compared with the arrangement of the cartridge type HDD units in the side portion of the main body of the image forming apparatus 1. Since the cartridge type HDD units are arranged near the operation panel 8, after the HDD turn-off switch 9 (see FIG. 1) which is also the attaching and detaching instruction switch of the HDD main body 33 is pressed, the cartridge type HDD units are drawn by unlocking the lock key 26 (see FIG. 5), which allows the working to be efficiently performed.

Figure 13:
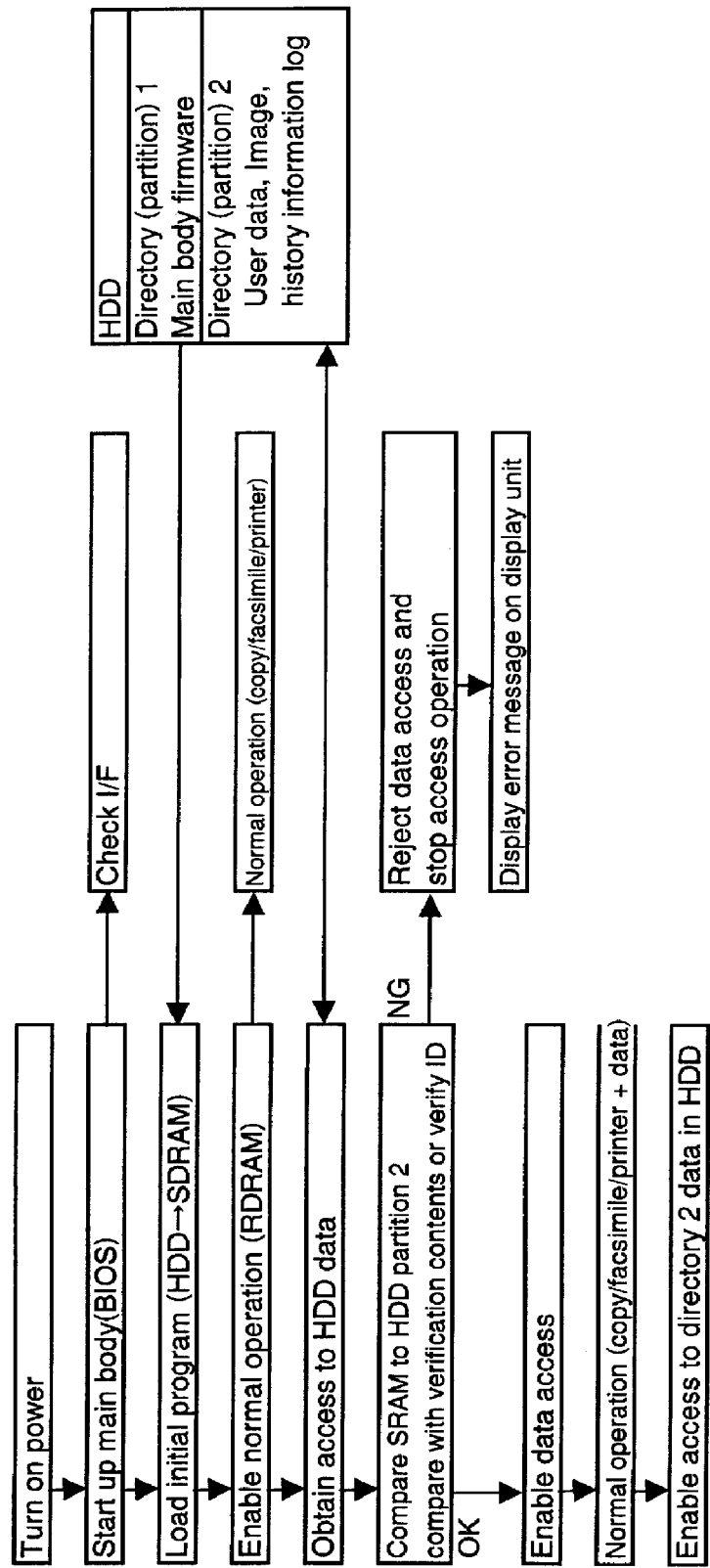
FIG. 13 is a flowchart showing control of the cartridge type HDD unit.

FIG. 13 is a flowchart showing the control when the removal HDD is used. A security system includes the image forming apparatus main body, the detachably attachable HDD, RDRAM and SDRAM provided on the control board in the image forming apparatus, the operation display unit which is of a user interface, and software which controls these constituents.

Referring to FIG. 13, HDD is divided into two partitions. Firmware for controlling the main body is stored in a partition 1. A partition 2 is used as a data area, and image data and a history/information log which are of user data are stored in the partition 2. This method is adopted in the embodiment in order to distinguish the robust firmware from the user data. However, in one partition in one HDD, the same configuration can be achieved only by dividing folders which are of a directory as needed.

In order to further make clear the security, a method in which two HDDs are used, the firmware is stored in one of HDDs, and the user data is stored in the other HDD can be realized.

In FIG. 13, when the image forming apparatus is turned on, BIOS including hardware in the main body is started up, which checks the initial interface. It is determined that the devices are normally operated.

Then, the access to the partition 1 of HDD is performed to load the main body firmware, stored in HDD, to the controller of the image forming apparatus main body.

The firmware of HDD is loaded on SDRAM, and the control necessary to the image forming apparatus is enabled. The normal operations of the image forming apparatus can be performed except for the access to the partition 2 of HDD.

This is the so-called single function, i.e., the operation in which only the copy is made or the facsimile transmission is performed while writing or reading action is not performed in the user area of the partition 2 of HDD.

When, the user try to get access to the user data of HDD, the security, the history, the structure, and the like are written in RDRAM provided on the controller board in the image forming apparatus main body, and these contents are verified against contents of the partition 2 of HDD.

When the verification result is correct, the access to the user data area can be obtained, so that the stored image can be printed and electrically transmitted to other connected office automation instruments.

That is, the so-called full-access is enabled. In addition to the functions of the copying machine, the facsimile, and the printer, not only the access to an image (including document) database can be obtained in the image forming apparatus main body because the data access is enabled, but also the access to the outside can be obtained through a network such as LAN.

On the other hand, in the unauthorized case such that the different HDD is attached or the like, when the user gets access to the user data of HDD, the verification result becomes mismatched in verifying the security, the history, the structure, and the like written in RDRAM provided on the controller board in the image forming apparatus main body against contents of the partition 2 of HDD.

When the verification result is mismatched, the denial determination that the access to the user data area is prevented is performed. Therefore, the interface to the partition 2 is interrupted to disable the access to the partition, so that the writing operation from the main body to HDD and contents confirmation from the network cannot be performed.

An error message that the access to the user data area cannot be obtained because the hard disk is unauthorized is displayed on the screen of the operation panel, and the message that encourages the user to attach the correct HDD is also displayed on the screen.

Figure 14:
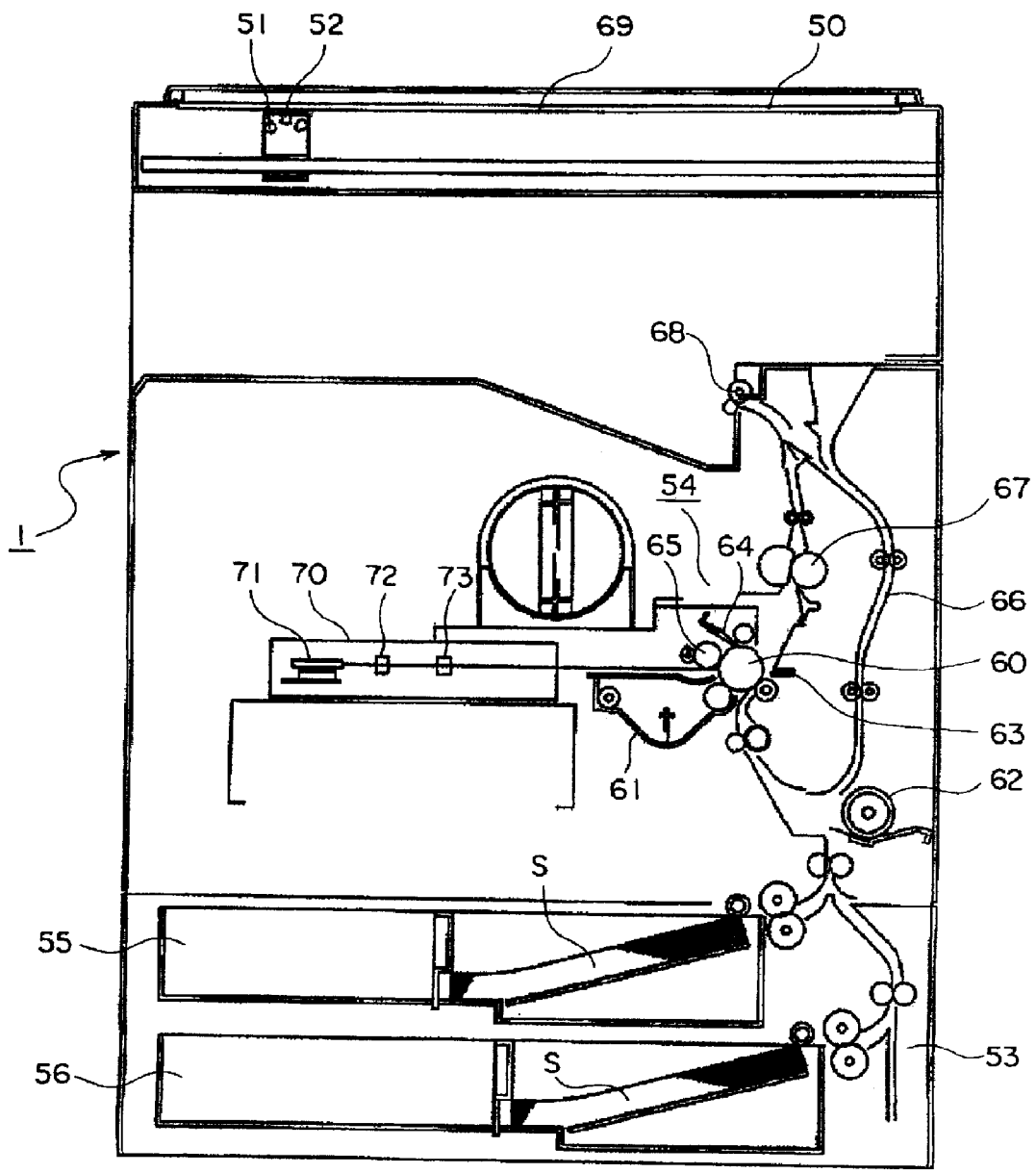
FIG. 14 is a sectional view showing an example of an image forming apparatus mechanism on which the cartridge type HDD unit of each above embodiment is mounted.

FIG. 14 is a structural chart showing an example of the image forming apparatus 1 on which the cartridge type HDD unit 20 of the above embodiment is mounted to be able to realize the suitable operation.

The main body of the image forming apparatus 1 includes an original stacked plate 50, a light source 51, a reading device (CIS: Contact Image Sensor) 52, a sheet feeding unit 53, and image forming unit 54. The sheet feeding unit 53 has cassettes (housing container) 55 and 56 which are detachably attachable to the image forming apparatus 1. Sheet materials S such as plain paper are stored in the cassettes 55 and 56, and each cassette is provided with sheet feeding rollers (sheet feeding means). The image forming unit 54 includes a cylindrical photosensitive drum 60, a development unit 61, a transfer charger 62, a separation charger 63, a cleaner 64, and a primary charger 65. A conveyance guide 66, a fixing device 67, a discharge roller 68, and the like are provided on the downstream side of the image forming unit 54.

The image forming apparatus 1 having the above configuration is operated as follows. When a sheet feeding signal is outputted from a control device (not shown), an original document 69 placed on the original stacked plate 50 is illuminated with a light beam emitted from the light source 51, and the light beam reflected from the original 70 is converted into an electric image signal by the reading device 52. Then, the electric image signal is electrically transmitted to a laser scanner device 70, and the photosensitive drum 60 is irradiated with a laser beam emitted from a laser diode (not shown) through a rotary polygon mirror 71 and lenses 72 and 73. The photosensitive drum 60 is previously charged by the primary charger 65, an electrostatic latent image is formed on the photosensitive drum 60 by the laser beam irradiation, and the electrostatic latent image is developed and visualized as a toner image by the development unit 61. On the other hand, in the sheet material S conveyed from the sheet feeding unit 53, skew feeding is corrected by a registration roller 74. Then, the sheet material S is conveyed to the image forming unit 54 with exact timing. In the image forming unit 54, the toner image on the photosensitive drum 60 is transferred to the sheet material S by the transfer charger 62, the sheet material S to which the toner image is transferred is charged in an opposite polarity to the transfer charger 62 by the separation charger 63, and the sheet material S is separated from the photosensitive drum 60.

The sheet material S separated from the photosensitive drum 60 is conveyed to the fixing device 67 while guided by the conveyance guide 66, and the unfixed transfer image is permanently fixed by pressurizing and heating the unfixed transfer image to the sheet material S with the fixing device 67. The sheet material S to which the image is fixed is discharged by the discharge roller 68.

The electrophotographic type image forming apparatus is described in the above embodiments. However, the invention prevents the data leakage generated in the case where the image forming apparatus is used, so that the invention can also be applied to a printing machine which outputs the image data, an inkjet printer and the like.

According to the cartridge type HDD of the invention, when the information stored in the built-in HDD is moved to the cartridge type HDD, the HDD main body is attached into and detached from the housing case in the substantially horizontal direction. Therefore, in the conventional art, there is the problem that the HDD main body is caused to fall carelessly in the attaching and detaching operation when the HDD main body is mounted to the housing case such that the HDD main body drops into the housing case in the vertical direction. However according to the invention, the above described problem is eliminated, and the attaching and detaching operation of the HDD main body can be performed easily and safely. Accordingly, the invention is effective in preventing the troubles such as the HDD main body breakage and the data loss due to the fall.

In addition to the above effects of the invention, according to the cartridge type HDD of the invention, the HDD main body attaching and detaching port of the cartridge type HDD housing case is opened toward the substantially horizontal direction, so that the foreign materials can be prevented from falling into and invading the cartridge type HDD housing case from the HDD main body attaching and detaching port unlike the conventional art in which the HDD main body attaching and detaching port is opened upward. That is, when the foreign material falls into the cartridge type HDD housing case, the cartridge type HDD does not work normally by obstructing the data communication due to the generation of contact failure of the connector in the case of dust, and there is a fear that the connector circuit is short-circuited in the case of metal such as a staple and a clip. However, the invention can eliminate the problems. Conventionally, in case of the trouble with the cartridge type HDD by the above causes, the foreign material is removed by contacting a special service person, the cartridge type HDD is exchanged when the cartridge type HDD is broken, or the a worrying operation such as a data restoring operation is required. However, the invention can eliminate the problems.

Further, according to the image forming apparatus of the invention, the information stored in the built-in HDD can be moved to the HDD main body of the cartridge type HDD unit, which allows the image forming apparatus and the built-in HDD not to be operated when the HDD main body of the cartridge type HDD unit is not attached. Accordingly, boot (initial program attaching in the start-up) information is loaded from HDD and expanded on ROM such that the pieces of information between HDD built in the image forming apparatus and the cartridge type HDD can be confirmed, which allows the image forming apparatus to be operated. As a result, the image forming apparatus and the built-in HDD are integrated in terms of function to enhance the security.

Thus, the embodiments of the invention are described. However, the invention is not particularly limited to the above embodiments, but various modifications and variations could be made within technical idea of the invention.

What is claimed is:

1. An image forming apparatus comprising:
    image forming device for forming a visible image on a recording medium;
    a unit case, disposed on a back face of a main body of the image forming apparatus in a horizontal orientation, for storing a recording device having identity data and being able to store image information; and
    a controller for verifying data input and the identity data of the recording device;
    wherein the controller refuses the image forming device access to the image information in a case where a verification result is mismatched, and the controller allows the image forming device access to the image information to form an image on the recording medium in a case where the verification result is matched.

2. An image forming apparatus according to claim 1, wherein the recording device includes firmware and the controller accesses the firmware.

3. An image forming apparatus according to claim 1, wherein the controller controls the image forming device when the controller accesses the firmware.

4. An image forming apparatus according to claim 1, wherein the data input is stored in a RAM.

5. An image forming apparatus according to claim 4, wherein the controller verifies the identity data and the data input stored in the RAM.

6. An image forming apparatus according to claim 1, wherein an error message is shown in a display portion in a case where the verification result is mismatched.

7. An image forming apparatus according to claim 1, wherein the image forming device includes an image bearing member and toner image forming means for forming toner images on the image bearing member.

8. An image forming apparatus according to claim 1, wherein a connector for connecting the recording device and the image forming apparatus electrically is disposed at an inner part of the unit case in an inserting direction of the recording device.

9. An image forming apparatus according to claim 1, wherein the recording device includes a hard disk drive.

10. An image forming apparatus according to claim 4, wherein the image forming device previously included another hard disk drive other than the hard disk drive of the recording device.

* * * * *